United States Patent [19]

Andreasen

[11] Patent Number: 4,882,870

[45] Date of Patent: Nov. 28, 1989

[54] TRAWLER DOOR

[76] Inventor: Peter S. Andreasen, Sprogovej 10 A, DK-7680 Thyboron, Denmark

[21] Appl. No.: 266,816

[22] Filed: Nov. 3, 1988

[51] Int. Cl.$^4$ ............................................. A01K 73/04
[52] U.S. Cl. ...................................................... 43/9.1
[58] Field of Search ............................................... 43/9

[56] References Cited

U.S. PATENT DOCUMENTS

| | | | |
|---|---|---|---|
| 2,816,385 | 12/1957 | Luketa | 43/9 |
| 2,942,371 | 6/1960 | Johnson | 43/9 |
| 3,410,014 | 11/1968 | Jenssen | 43/9 |
| 4,640,037 | 2/1987 | Ashworth | 43/9 |

FOREIGN PATENT DOCUMENTS

| | | | |
|---|---|---|---|
| 70240 | 6/1952 | Netherlands | 43/9 |
| 1132058 | 10/1968 | United Kingdom | 43/9 |

Primary Examiner—Gene P. Crosby
Attorney, Agent, or Firm—Lee & Smith

[57] ABSTRACT

A trawler door with relative dimensions such that the height of the door is at most seventy five percent of its length. Two longitudinally arcuate platelike body parts are joined along a longitudinal edge at an obtuse angle, the joint between the body parts being stiffened by a platelike reinforcing member extending along the length of the joint. At least one of the body parts is stiffened by at least one tubelike member of circular or elliptical cross-section which is affixed at one end to the reinforcing member and at the other end to a suitable location on one of the body parts.

4 Claims, 3 Drawing Sheets

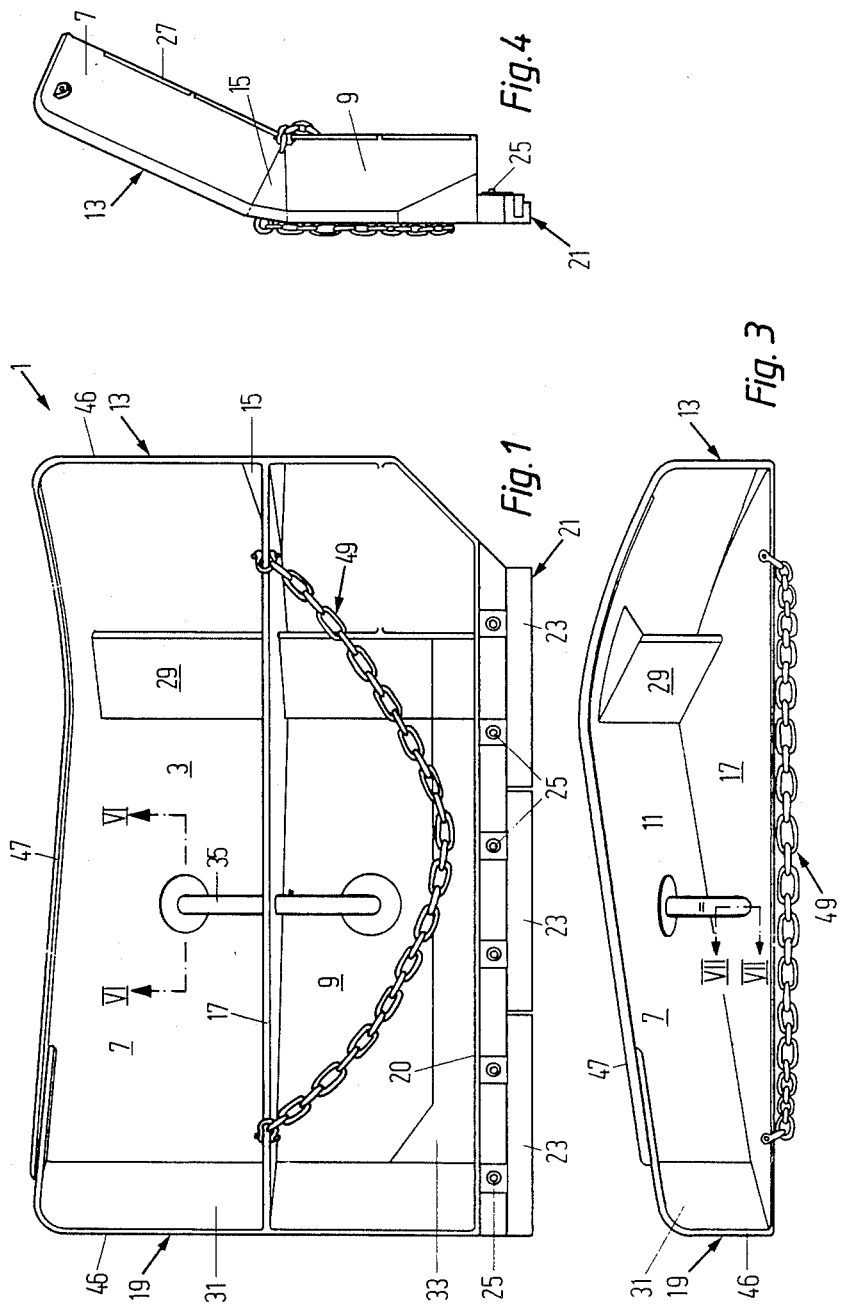

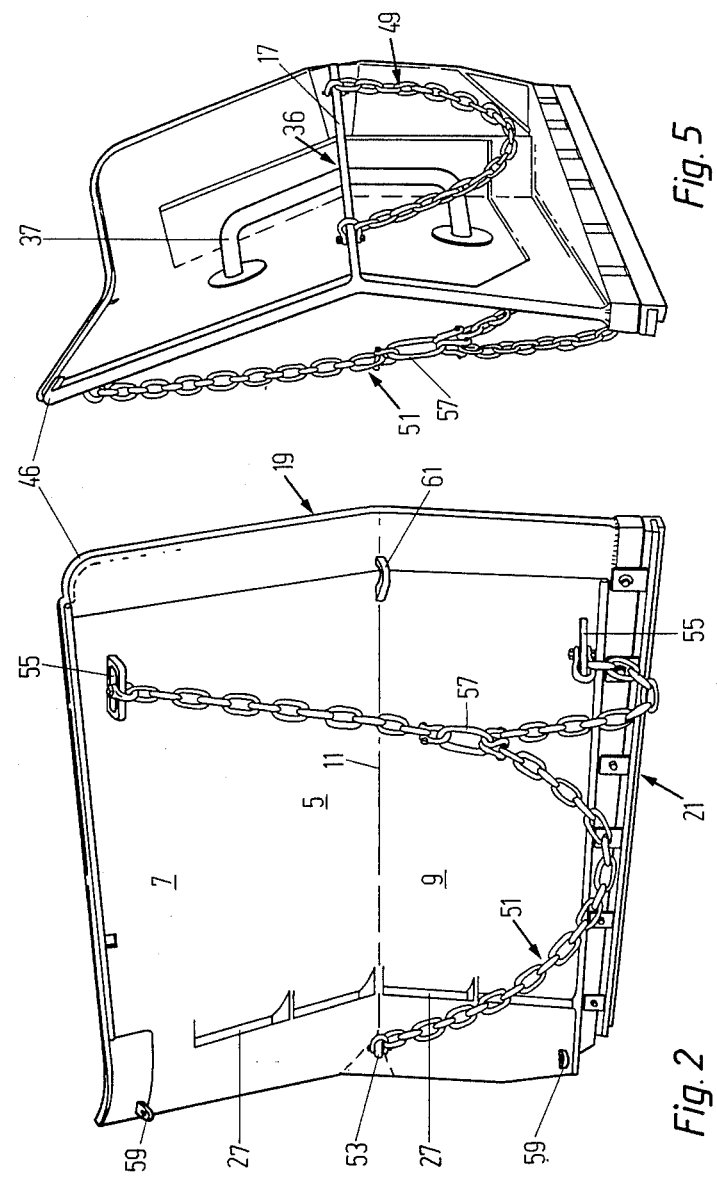

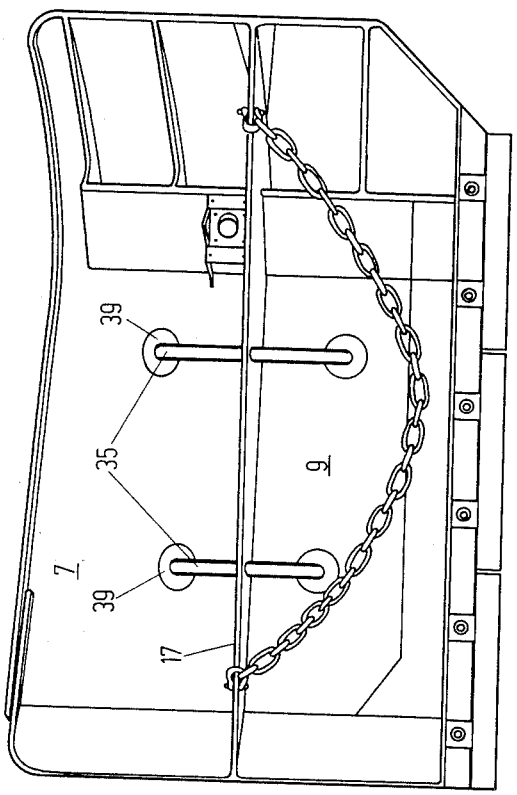
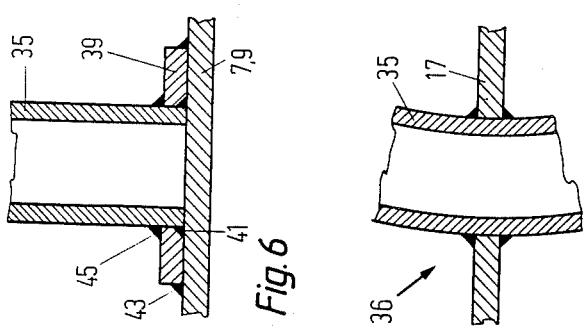
Fig. 8
Fig. 6
Fig. 7

TRAWLER DOOR

BACKGROUND OF THE INVENTION

The invention concerns an implement used in trawler fishing, commonly known as trawler doors or otter boards, which are utilized for spreading the net in the water behind a towing fishing vessel. The invention relates especially to the kind of trawler doors known as the cambered Vee-type, in which two cambered platelike parts are joined along their longest edge, forming an obtuse angle between them.

The use of trawler doors is illustrated in U.S. Pat. No. 4,045,901. Cambered Vee-type trawler doors are disclosed in Great Britain Pat. No. 855,746 where the camber may be described as an aerofoil section when looking at the door from the top. In such a aerofoil section the trailing part has a larger curving radius or may be almost straight compared with the leading part which has a rather small radius of curvature.

In use for demersal fishing on or close to a rocky bottom, as in some waters off the U.S. coast, trawler doors suffer rough treatment when they hit obstacles as rocks or cliffs. Also, the doors are subject to metal fatigue since the pulling force from the fishing vessel during fishing is transferred through the warps to the doors and further on to the trawl net, which force varies according to the circumstances when fishing, hauling up the catch, and when the doors are out of use. As the chains connecting the net to the door are fastened to the platelike parts of the door, the door is subjected to considerable bending moments, which tend to bend the door along a line parallel to the longitudinal axis of the door.

In order to counter these loads and to prevent an early breakdown of the doors, stiffning members or struts with a T-shaped cross-section have been provided stretching mainly vertically from the central rib to the edge of the door. The T-shaped members are disadvantageous, however, in respect to the hydrodynamic resistance produced by the part of the T-shaped members extending transversely to the waterflow past the members while fishing with the door.

SUMMARY OF THE INVENTION

It is an object of the invention to provide stiffening means for a trawler door that produces less hydrodynamic resistance while fishing.

It is also an object of the invention to provide a simple and durable way of construction for a trawler door of the cambered Vee-type.

These and other objects are attained by a trawler door with relative dimensions in its functional position such that the height of the door is at most seventy five per cent of its length. The door comprises two longitudinally arcuate platelike body parts joined along a long edge with an obtuse angle between the body parts, the joint between the body parts being stiffened by a platelike reinforcing member extending substantially along the whole length of the joint. At least one of the body parts is stiffened by at least one tubelike member of circular or elliptical cross section affixed at one end to the reinforcing member and at the other end to a point on one of the body parts.

The tubelike members according to the invention offer less resistance to the water flow past the trawler door, which enhances the performance of the door while fishing.

In accordance with these and other objects which will be apparent hereinafter, the present invention will now be described with particular reference to the accompanying drawings.

BRIEF DESCRIPTION OF THE DRAWINGS

FIG. 1 shows a view of the front side of a trawler door according to the invention, FIG. 2 shows a perspective view of the back side of the trawler door shown in FIG. 1, FIG. 3 shows the trawler door in FIG. 1 as seen from above, FIG. 4 shows the trawler door in FIG. 1 as seen from the fore end, FIG. 5 shows the trawler door in FIG. 1 as seen in a perspective view from the trailing end, FIG. 6 shows a section on the line VI—VI of FIG. 1, FIG. 7 shows a section on the line VII—VII of FIG. 3, and FIG. 8 shows another embodiment of a trawler door according to the invention as seen from the front side.

DESCRIPTION OF THE PREFERRED EMBODIMENTS

Referring now to FIGS. 1-3, a port trawler door 1 according to a first embodiment of the invention is illustrated, the door 1 having front side 3 and a back side 5. The starboard door is similar in every detail to the port door, only being a mirror image of the port door.

The door 1 is made of two steel plates 7 and 9 welded together along a joint 11. The plates 7 and 9 have both a curvature of form varying in such a way that the curving radius is least near the leading end 13 of the door so that the curvature closely resembles the upper surface of an aerofoil. As shown in FIG. 4 the plates 7, 9 are joined at an obtuse angle between the plates 7, 9. As a result of this angling, an opening between the plates 7, 9 appears near the leading end 13, which opening is closed by a triangular piece 15 welded in place.

A reinforcing member 17 is welded to the joint 11 stretching from the leading end 13 to the trailing end 19.

Opposite the joint 11 the part 9 is closed by a bottom plate 20 to which a keel 21 of rectangular cross-section is welded. The keel 21 may have changeable shoes 23 mounted with screws 25 on the keel 21.

The trawler door according to the invention has one or more slots 27 with a water flow guiding member 29 welded at one side of the slots 27 and extending from the front side 3.

Near the trailing end 19 and near the bottom plate 20 strengthening plates 31 and 33 lying flat on the plates 7 and 9 have been welded to the latter.

A strut 35 which is in one piece extends on both sides of the member 17 and is formed with a slight bend 36 approximately at the middle and two mainly rectangular bends 37 near its free ends. The strut 35 is mounted by passing it through a hole in the member 17 and welding their connection in a conventional fashion, as illustrated in FIG. 7.

The free ends of the strut 35 are supplied with reinforcing annular rings 39. The method of fastening the free ends of the strut 35 appears in FIG. 6, where the strut 35 first is welded to the plate parts 7 or 9 with a welding seam 41. The rings 39, which have previously been placed around the strut 35 are then slid into position and welded in place with seams 43 and 45.

The edge of the trawler door is preferably strengthened by welding a cut-open steel tube 46 along the fore and trailing ends 13 and 19. Along the top of the door a rectangular hollow steel profile 47 may be welded on one side of the edge with the same purpose. Alternatively, a cut-open steel tube may be used as mentioned above.

The trawler door according to the invention is furnished with drawing gear in the form of a chain 49 on the front side and preferably three connected chain pieces 51 on the back side. The chain 49 is connected by shackles to holes (not illustrated) in the member 17 and is used for transferring the pulling force from the warps of a fishing vessel to the door 1. Similarly, the chains 51 transfer the pulling force from eyelets 53 and 55 on the back side further on to the trawl net by a shackle 57. The chain-rigging may be changed to other configurations, such as a four-point setting in which four chains in a similar way are gathered with a shackle and connected to the door by eyelets 55 and 59. A two-point rigging corresponding to that on the front side may be obtained by utilizing the eyelets 53 and 61.

Another embodiment of the present invention as shown in FIG. 8 illustrates two struts 35 of slightly different size. Each strut is made and attached to the door as described above. This variant is preferred on the larger sizes of trawler doors according to the invention.

What I claim is:

1. A trawler door with relative dimensions in its functional position such that the height of the door is at most seventy five per cent of its length, comprising two longitudinally arcuate platelike body parts joined along a longitudinal edge with an obtuse angle between said body parts, the joint between said body parts being stiffened by a platelike reinforcing member extending substantially along the whole length of said joint, at least one of the said body parts being stiffened by at least one tubelike member of circular or elliptical cross section affixed at one end to the said reinforcing member and at the other end to a location on one said body parts.

2. A trawler door according to claim 1, wherein each said tubelike member is surrounded by annular disk-shaped reinforcing members at the fixation point of said tubelike member to the said body parts.

3. A trawler door according to claim 1, wherein each said tubelike member extends through a hole in said platelike reinforcing member and is substantially symmetrical on both sides of said member.

4. A trawler door according to claim 2, wherein each said tubelike member extends through a hole in said platelike reinforcing member and is substantially symmetrical on both sides of said member.

* * * * *